(12) United States Patent
Zott

(10) Patent No.: US 7,200,983 B2
(45) Date of Patent: Apr. 10, 2007

(54) SUPPORTING DISC FOR A SUPPORTING DISC BEARING OF OPEN-END SPINNING ROTORS AND METHOD OF MAKING SAME

(75) Inventor: Werner Zott, Donzdorf (DE)

(73) Assignee: Maschinenfabrik Rieter AG, Winterthur (CH)

( * ) Notice: Subject to any disclaimer, the term of this patent is extended or adjusted under 35 U.S.C. 154(b) by 566 days.

(21) Appl. No.: 10/820,745

(22) Filed: Apr. 9, 2004

(65) Prior Publication Data

US 2004/0202100 A1 Oct. 14, 2004

(30) Foreign Application Priority Data

Apr. 14, 2003 (DE) .............................. 103 18 304

(51) Int. Cl.
*D01H 13/26* (2006.01)
(52) U.S. Cl. .......................................... 57/264; 57/406
(58) Field of Classification Search ................. 57/264, 57/404, 406, 407
See application file for complete search history.

(56) References Cited

U.S. PATENT DOCUMENTS 5,509,262 A * 4/1996 Stahlecker ................... 57/264
5,675,964 A 10/1997 Stahlecker
5,799,478 A * 9/1998 Legrom ....................... 57/406
6,212,868 B1 * 4/2001 Braxmeier ................... 57/406
6,269,622 B1 * 8/2001 Simon ......................... 57/406

FOREIGN PATENT DOCUMENTS

DE 101 30 734 1/2003
EP 1338686 A1 * 8/2003

* cited by examiner

Primary Examiner—Shaun R. Hurley
(74) Attorney, Agent, or Firm—Crowell & Moring LLP

(57) ABSTRACT

A supporting disc for a supporting disc bearing of open-end spinning rotors has a disc-like base body, on whose outer circumference a tire-like covering is applied. On a front side of the supporting disc facing the operator's side of the spinning aggregate, a cylinder-shaped permanent magnet for non-contact speed monitoring is arranged at a distance from the axis of the supporting disc. For the purpose of the correction of mass imbalances, the permanent magnet is inserted into a through bore hole, which is filled out by the permanent magnet only up to a gradation of diameters which serves as a stopping surface. As the permanent magnet is arranged in the transition area between the base body and the tire-like covering, the part of the through bore hole not filled out by the permanent magnet can be filled out by the covering.

11 Claims, 3 Drawing Sheets

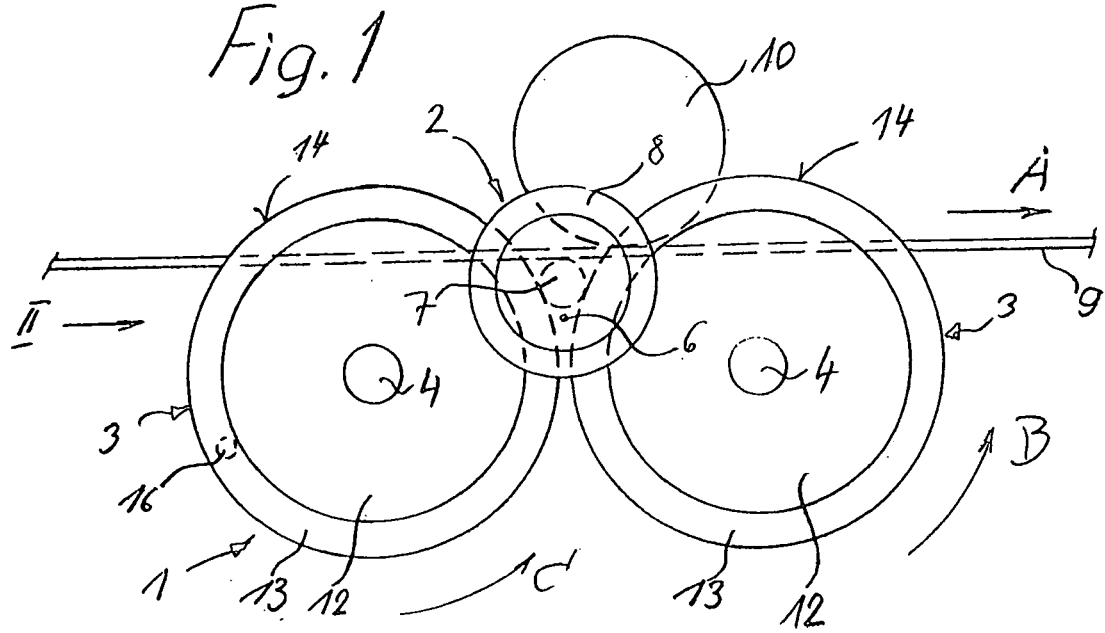
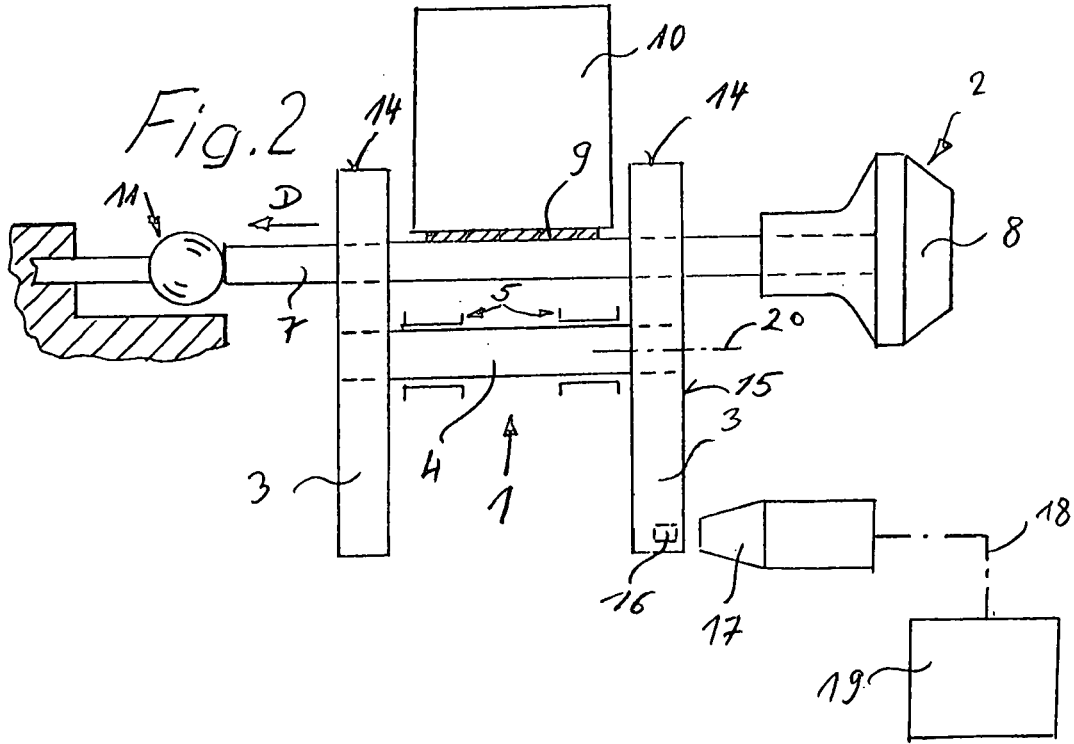

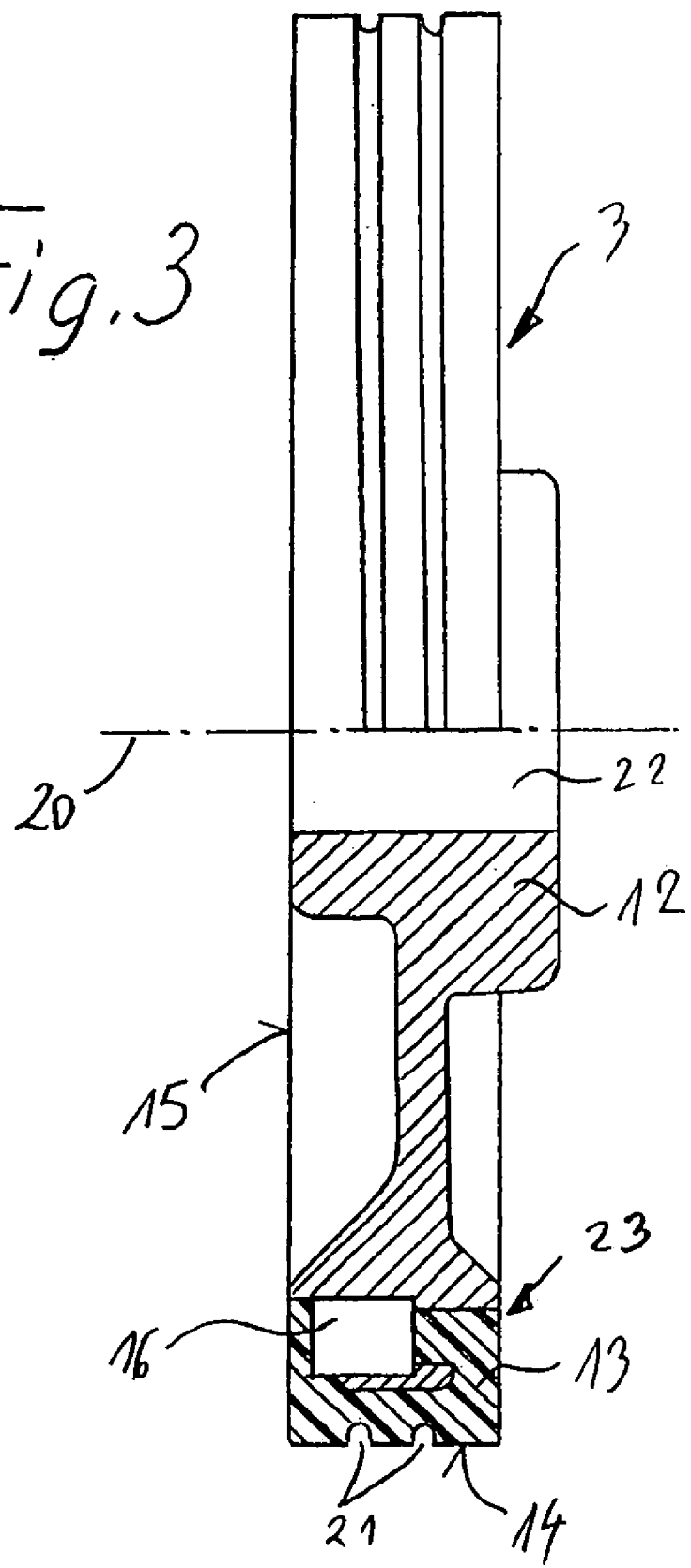

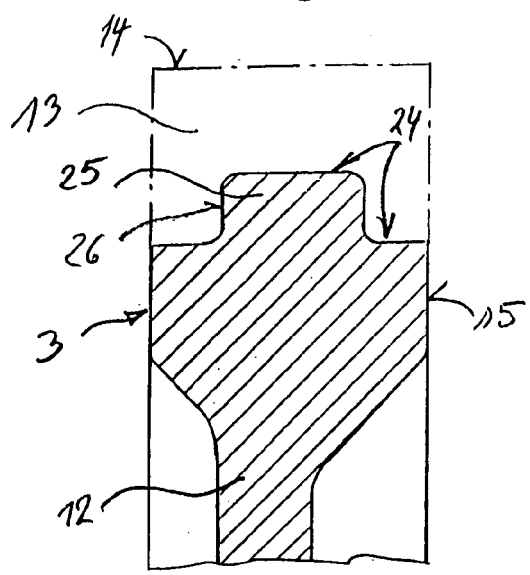
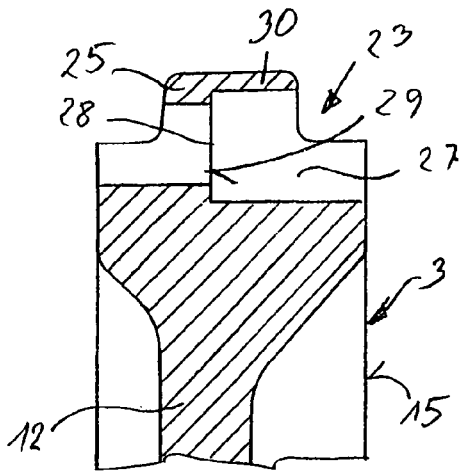
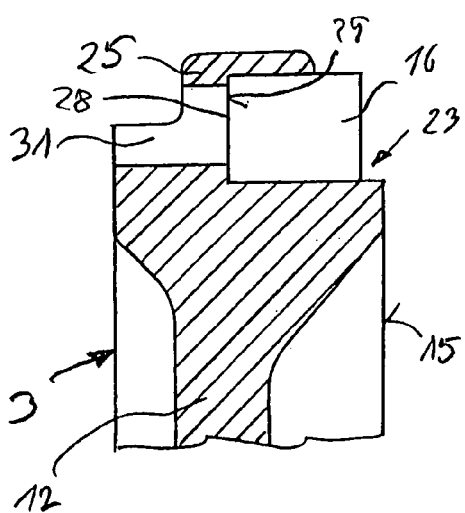
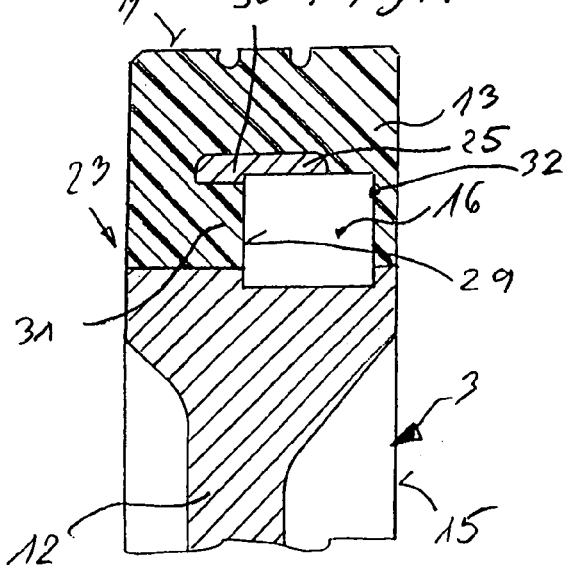

SUPPORTING DISC FOR A SUPPORTING DISC BEARING OF OPEN-END SPINNING ROTORS AND METHOD OF MAKING SAME

BACKGROUND AND SUMMARY OF THE INVENTION

This application claims the priority of German Application No. 103 18 304.3 filed Apr. 14, 2003, the disclosure of which is expressly incorporated by reference herein.

The present invention relates to a supporting disc for a supporting disc bearing for open-end spinning rotors, comprising a disc-like base body having on its outer circumference a tire-like covering as well as a front side, in which a cylinder-shaped permanent magnet is inserted in a through bore hole and arranged at a distance from the axis of the supporting disc, which through bore hole is filled in by the permanent magnet only up to a gradation of diameters serving as a stopping surface, while the remaining part of the through bore hole serves to correct mass imbalances and is filled in by a filling material which is lighter in comparison to the specific weight of the permanent magnet and the base body.

A supporting disc of this type is prior art in U.S. Pat. No. 5,675,964. Methods for correcting mass imbalances of the permanent magnet applied to the known supporting disc are described in this publication in many variations. In one variation, a compensatory balancing weight is arranged diametrically opposite the permanent magnet, while in another variation a correction of mass imbalances is achieved in that in the supporting disc, material from the base body is removed in the area of the permanent magnet, for example by means of extending a bore hole in which the permanent magnet is taken up.

It is known that spun yarns break for a variety of reasons during operation. When this happens, the already spun yarn end must be pieced, that is, joined again with the fibers fed into a hollow inner space of the open-end spinning rotor. This takes place in the case of many operating machines by starting up the previously stopped open-end spinning rotor. It is important hereby to know, at any given moment of the piecing process, at what speed the open-end spinning rotor is rotating. This happens in practice by means of non-contact sensoring of the actual speed of a supporting disc, which indirectly gives information on the actual speed of the open-end spinning rotor which is supported on the supporting disc pairs.

The known supporting disc according to the above mentioned U.S. Pat. No. 5,675,964 has the advantage in that one single permanent magnet is sufficient for non-contact speed monitoring, without fear of mass imbalances occurring during rotation of the supporting disc. In the case of the known supporting disc, a direct correction of mass imbalances is created, namely in the area of the permanent magnet itself. The disadvantage in the case of the known supporting disc, however, is that the permanent magnet is glued into the through bore hole, which is complicated in respect to its fabrication.

In the non-generic German published patent application 101 30 734, two permanent magnets are disclosed, which are diametrically disposed to one another in relation to the axis of the supporting disc, and are located on the transition area between the base body and the tire-like covering. This has the basic advantage in that the permanent magnets can be secured to the base body by means of the tire-like covering itself. No correction in mass imbalance in the area of the permanent magnets is provided. The through bore holes, which serve as take-up receptacles for the permanent magnets, do not have any gradation of diameters serving as stopping surfaces, and the through bore holes are completely filled out by the respective permanent magnets.

It is an object of the present invention to manufacture a supporting disc of the above mentioned type in a more production-friendly way, while using the advantage known in German published patent application 101 30 734, namely to use the tire-like covering for fastening the permanent magnet.

This object has been achieved in accordance with the present invention in that the permanent magnet is arranged in the transition area between base body and tire-like cover, and in that the part of the through bore hole not filled out by the permanent magnet is instead filled out by the tire-like cover.

The supporting disc according to the present invention has the advantage in that one permanent magnet is sufficient for the purpose of non-contact speed monitoring, whereby gluing of the permanent magnet in the through bore hole can be omitted, as, due to the provided position of the permanent magnet in the transition area between base body and the tire-like cover, the latter fills out the part of the through bore hole not filled out by the permanent magnet and thus fixes the permanent magnet.

In an embodiment of the present invention, the base body is provided on its outer circumference with an annular ring which anchors the tire-like cover, in which, however, in contrast to the known supporting disc, not only the through bore hole is located, but also the gradation of the diameter.

It can be provided for the purposes of the present invention, that the permanent magnets project out of the through bore hole on the side facing away from the gradation of diameters and is fixed in this area by the tire-like cover. It has been shown that it is favorable for the correction of mass imbalances when the gradation of diameters is located approximately in the center of the through bore hole.

These and further objects, features and advantages of the present invention will become more readily apparent from the following detailed description thereof when taken in conjunction with the accompanying drawings wherein.

BRIEF DESCRIPTION OF THE DRAWINGS

FIG. 1 is a view onto a supporting disc bearing of open-end spinning rotors, as seen from an operator's side of the spinning aggregate;

FIG. 2 is a view in the direction of arrow II of FIG. 1;

FIG. 3 is in greatly enlarged dimensions a supporting disc according to the present invention, partly in axial section and partly in side view; and FIGS. 4 to 7, in further enlarged dimensions, are each sections of FIG. 3 in the area of the permanent magnet, to demonstrate the procedural steps for applying the permanent magnet.

DETAILED DESCRIPTION OF THE DRAWINGS

The supporting disc bearing 1 of an open-end spinning rotor 2 shown in FIGS. 1 and 2 is a component part of an open-end spinning aggregate. The supporting disc bearing 1 comprises four supporting discs 3 overall, of which two are supported on a joint axle 4. The axles 4 are supported by means of anti-friction bearings 5 in bearing housings (not shown). The supporting discs 3 are arranged in pairs in such a way that two wedge-shaped gaps 6 are formed, in which the shaft 7 of the open-end spinning rotor 2 is supported in radial direction. The shaft 7 supports, on its end facing towards the operator's side of the spinning aggregate, a rotor cup 8, in whose interior the yarn formation takes place in the known way.

The shaft 7 is driven by means of a tangential belt 9, which runs towards the shaft 7 between the supporting disk pairs while holding the shaft 7 simultaneously in the wedge-shaped gaps 6. The tangential belt 9 is weighted with a pressure roller 10 in close proximity to the shaft 7.

The axles 4 of the supporting disc pairs are aligned slightly inclined in relation to one another to the amount of a very small angle in such a way that an axial thrust is generated in the direction of the arrow D in connection with the running direction A of the tangential belt 9 by means of the rolling movement of the shaft 7 on the supporting discs 3 rotating in corresponding rotational directions B and C, which axial thrust loads the shaft 7 with its free end in the direction of a step bearing 11.

The supporting discs 3 each comprise a disc-like base body 12 as well as a tire-like cover 13, whose circumferential surfaces form the running surfaces 14 for the shaft 7 of the open-end spinning rotor 2. The base body 12 is made, for the purposes of the invention, of a plastic or of an aluminum alloy, while the tire-like cover 13 is made of a suitable plastic.

For the reasons mentioned above, one of the supporting discs 3 facing the operator's side of the spinning aggregate is designed on its front side 15 in a particular way for the purposes of non-contact speed monitoring. This supporting disc 3 comprises a permanent magnet 16, to which provision for correcting mass imbalance is arranged which is described below in more detail.

When maintenance becomes necessary, a sensor device 17 of a traveling maintenance device (not shown) can be arranged adjacent the supporting disc 13 comprising the permanent magnet 16. The maintenance device travels along the length of the spinning aggregates of the open-end spinning machine in the known way. The sensor device 17 can scan the front side 15 of the supporting disc 3 comprising the permanent magnet 16 without contact thereto and is connected via an electric cable 18 with an evaluating device 19 of the maintenance device. This evaluating device 19 is in turn connected with, for example, control motors of the maintenance device in a way not shown. In this way, during the starting up of an open-end spinning rotor 2 from its stopped position to its operating speed, a piecing process can be carried out.

As can be seen in FIGS. 1 and 2, the permanent magnet 16 is arranged at a certain distance from the axis 20 of the relevant supporting disc 3.

In FIG. 3, in greatly enlarged dimensions, an axial section of the supporting disc 3 according to the present invention is shown, whereby the front side 15 facing the operator's side now shows to the left. The disc-shaped base body 12 with its tire-like cover 13 can be seen, on whose running surface 14 the shaft 7 of the open-end spinning rotor 2 is radially supported. It can also be seen that on the front side 15 facing towards the operator's side, a cylinder-shaped permanent magnet 16 is applied.

The tire-like cover 13 is fixed to the base body 12 by means of a suitable anchoring device, which is described below with the aid of FIGS. 4 to 7. The running surface 14 of the tire-like cover 13 comprises in the known way at least one cooling groove 21, in order to avoid heat damage as far as possible during operation.

The disc-shaped base body 12 comprises in the area of its axis 20 a center bore hole 22 for the respective axle 4. Furthermore, from the front side 15, a bore hole, described in more detail below, is made for the permanent magnet 16 in the form of a cylindrical pin.

The permanent magnet 16 is located on the transition area 23 between the base body 12 and the tire-like cover 13. The permanent magnet 16 is clearly shorter than the width of the supporting disc 3. For example, it can be provided that the tire-like cover 13 is approximately 10 mm wide, while the length of the permanent magnet 16 measures approximately only 6 mm.

The arrangement of the permanent magnet 16 on the supporting disc 3, shown in sections and greatly enlarged, is described below in more detail with the aid of FIGS. 4 to 7.

As can be seen in FIG. 4, the tire-like cover 13, applied to the outer circumference 24 of the base body 12 of a supporting disc 3, said tire-like cover 13 being denoted only by a dot-dash line, is anchored to the base body 12 by means of an annular ring 25 in the form of a so-called hat profile. This annular ring 25 comprises at least approximate radial flanks 26. With this embodiment, a good positive fit is achieved for the connection between the tire-like cover 13 and the base body 12 when the tire-like cover 13 is molded.

Otherwise to be seen in FIG. 4 is the running surface 14, denoted by a dot-dash line, which supports the shaft 7 of the open-end spinning rotor 2, as well as the front side 15 facing the operator's side of the spinning aggregate, which front side 15 is shown here without a permanent magnet.

The following FIGS. 5, 6 and 7 show the individual steps of how the one permanent magnet 16 is applied to the transition area 23 between the base body 12 and the tire-like cover 13.

According to FIG. 5, a through bore hole 27 is applied to the annular ring 25, which through bore hole 27 is in part not limited to the annular ring 25. In the annular ring 25, the through bore hole 27 is a completely closed bore hole, while to the right and to the left of the annular ring 25, a semi-spherical recess occurs. The through bore hole 27 comprises, still inside the annular ring 25, a gradation of diameters 28, so that a stopping surface 29 for the permanent magnet 16 occurs.

A material rim 30 remains in the annular ring 25 after the hole has been bored, so that also in the area of the permanent magnet 16 an anchoring between the base body 12 and the tire-like cover 13 can take place.

According to FIG. 6, the permanent magnet 16 is now set into the through bore hole 27 from the front side 15 of the supporting disc 3, namely up to the stopping surface 29. The part 31 of the through bore hole 27 is thus not filled out by the permanent magnet 16 and serves, with the correct dimensions, to correct mass imbalance.

After the permanent magnet 16 has been inserted, the tire-like cover 13 is molded onto the base body 12 according to FIG. 7. As can be seen, the tire-like cover 13 surrounds the permanent magnet 16 on its end sides as well as partly in radial direction. The end face 32 of the permanent magnet 16 facing towards the operator's side is entirely fixed by the tire-like covering 13, while the permanent magnet 16 is fixed on its other end face by the stopping surface 29. As can be seen, the tire-like cover 13 fills the part 31 of the through bore hole 27 not taken up by the permanent magnet 16.

As can be further seen in FIG. 3, two cooling grooves 21 are applied in the known way to the running surface 14, on which the shaft 7 of the open-end spinning rotor 2 is supported, which cooling grooves 21 serve to divert heat away from the running surface 14.

As the specific weight of the tire-like cover 13 is significantly smaller than that of the permanent magnet 16 and the base body 12, part 31 of the through bore hole 27, which is not filled out by the permanent magnet 16, provides, with the correct dimensions, a total correction of mass imbalance.

With regard to further improvement, the present invention does not exclude the possibility of applying further, smaller bore holes in close proximity to the permanent magnet 16, which are also filled out by the tire-like cover.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A supporting disc for a supporting disc bearing for open-end spinning rotors, comprising a disc-like base body having on its outer circumference a tire-like covering as well as an end face, in which a cylinder-shaped permanent magnet is inserted in a through bore hole and arranged at a distance from the axis of the supporting disc, which through bore hole is filled in by the permanent magnet only up to a gradation of diameters serving as a stopping surface, while the remaining part of the through bore hole serves as a mass balancer and is filled in by a filling material which is lighter in comparison to the specific weight of the permanent magnet and the base body, wherein the permanent magnet is arranged in the transition area between the base body and the tire-like cover, and wherein the part of the through bore hole not filled out by the permanent magnet is filled out by the tire-like cover.

2. A supporting disc according to claim 1, wherein the base body comprises on its outer circumference an annular ring which anchors the tire-like cover, in which the annular ring, the through bore hole with the gradation of diameters is located.

3. A supporting disc according to claim 1, wherein the permanent magnet projects out of the through bore hole on the side facing away from the gradation of diameters and is fixed in this area by the tire-like cover.

4. A supporting disc according to claim 2, wherein the permanent magnet projects out of the through bore hole on the side facing away from the gradation of diameters and is fixed in this area by the tire-like cover.

5. A supporting disc according to claim 1, wherein the gradation of diameters is located approximately in the center of the through bore hole.

6. A supporting disc according to claim 2, wherein the gradation of diameters is located approximately in the center of the through bore hole.

7. A supporting disc according to claim 3, wherein the gradation of diameters is located approximately in the center of the through bore hole.

8. A supporting disc for a supporting disc bearing for supporting an open-end spinning rotor shaft, comprising:

a disc-like base body made of a first material, a stepped through bore hole extending axially through the base body at a distance from a central base body axis, a permanent magnet disposed in the through bore hole and supported at a stop surface step of the through bore hole, said permanent magnet being made of a second material, and a tire-like cover surrounding the base body and filling portions of the through bore hole not occupied by the permanent magnet, said cover being formed of a third material which a lower specific weight than the first and second material, said tire like cover material service as a mass balancer for said supporting disc.

9. A supporting disc according to claim 8, wherein the base body includes an annular ring on its outer circumference which anchors the tire-like cover, and wherein said stepped through bore extends through the annular ring.

10. A supporting disc according to claim 8, wherein the tire like cover covers both axial end faces of the permanent magnet.

11. A method of making the disc of claim 8, comprising the sequential steps of:

forming the base body, boring the stepped through bore hole in the base body, axially inserting the permanent magnet into the bore hole until it is supported at the stop surface step thereof, and molding the tire like cover onto the base body and over both axial end faces of the magnet.

* * * * *